US010402755B2

(12) United States Patent
Tomiyama et al.

(10) Patent No.: US 10,402,755 B2
(45) Date of Patent: Sep. 3, 2019

(54) TRANSPORTATION SERVICE INFORMATION PROVIDING APPARATUS, AND TRANSPORTATION SERVICE INFORMATION PROVIDING METHOD

(71) Applicant: HITACHI, LTD., Tokyo (JP)

(72) Inventors: Tomoe Tomiyama, Tokyo (JP); Kojin Yano, Tokyo (JP)

(73) Assignee: HITACHI LTD., Tokyo (JP)

( * ) Notice: Subject to any disclaimer, the term of this patent is extended or adjusted under 35 U.S.C. 154(b) by 120 days.

(21) Appl. No.: 15/715,502

(22) Filed: Sep. 26, 2017

(65) Prior Publication Data

US 2018/0150774 A1 May 31, 2018

(30) Foreign Application Priority Data

Nov. 28, 2016 (JP) ................................ 2016-230279

(51) Int. Cl.
*G06Q 10/04* (2012.01)
*G01C 21/34* (2006.01)
(Continued)

(52) U.S. Cl.
CPC ....... *G06Q 10/047* (2013.01); *G01C 21/3423* (2013.01); *G01C 21/3492* (2013.01);
(Continued)

(58) Field of Classification Search
CPC ................................................... G06Q 10/047
See application file for complete search history.

(56) References Cited

U.S. PATENT DOCUMENTS 8,538,677 B2 * 9/2013 Gutman ............. G01C 21/3469 701/400
8,938,348 B2 * 1/2015 Nikovski ........... B61L 27/0027 701/400

(Continued)

FOREIGN PATENT DOCUMENTS

JP 2016-085734 A 5/2016

OTHER PUBLICATIONS

Extended European Search Report dated Apr. 5, 2018 for the European Patent Application No. 17194121.4.

*Primary Examiner* — Alex C Dunn
(74) *Attorney, Agent, or Firm* — Volpe and Koenig, P.C.

(57) ABSTRACT

A transportation service information providing system for providing information on transportation from a departure point to a destination point by a transportation facility, includes: a transportation facility specification unit specifying a transportation facility that performs transportation from the departure point to the destination point; a special transportation facility extraction unit extracting a special transportation facility which is a different transportation facility from the specified transportation facility and performs transportation for a partial section in the transportation from the departure point to the destination point; a special transportation facility specification unit specifying the special transportation facility as the transportation facility to be used for transportation from the departure point to the destination point, in a case where the extracted special transportation facility satisfies predetermined conditions relating to the transportation for the partial section; and a special transportation facility information output unit outputting information on the specified special transportation facility.

9 Claims, 15 Drawing Sheets

(51) Int. Cl.
*G08G 1/01* (2006.01)
*G08G 1/0968* (2006.01)
*G06Q 50/30* (2012.01)

(52) U.S. Cl.
CPC ........... *G06Q 50/30* (2013.01); *G08G 1/0104* (2013.01); *G08G 1/0112* (2013.01); *G08G 1/096838* (2013.01)

(56) References Cited

U.S. PATENT DOCUMENTS

| | | | | |
|---|---|---|---|---|
| 2011/0288765 | A1* | 11/2011 | Conway | G01C 21/3469 701/533 |
| 2015/0324945 | A1* | 11/2015 | Lord | G06Q 50/30 705/7.13 |
| 2015/0345951 | A1* | 12/2015 | Dutta | G01C 21/3605 701/400 |
| 2015/0377637 | A1 | 12/2015 | Tanizaki et al. | |
| 2016/0117610 | A1 | 4/2016 | Ikeda et al. | |
| 2016/0123748 | A1 | 5/2016 | Chidlovskii | |
| 2016/0320194 | A1* | 11/2016 | Liu | G01C 21/3438 |

* cited by examiner

TRANSPORTATION SERVICE PLAN INFORMATION DB 1

| NAME | TRANSPORTATION FACILITY | POINT | ARRIVAL TIME | DEPARTURE TIME | POINT | ARRIVAL TIME | DEPARTURE TIME | POINT | ARRIVAL TIME | DEPARTURE TIME | POINT | ARRIVAL TIME | DEPARTURE TIME | POINT | ARRIVAL TIME | DEPARTURE TIME |
|---|---|---|---|---|---|---|---|---|---|---|---|---|---|---|---|---|
| TRAIN 1 | TRAIN | POINT A | 7:29 | 7:30 | POINT B | 7:35 | 7:36 | POINT E | 7:46 | 7:47 | POINT F | 7:55 | 7:56 | POINT C | 8:03 | — |
| TRAIN 2 | TRAIN | POINT A | 7:39 | 7:40 | POINT B | 7:45 | 7:46 | POINT E | 7:56 | 7:57 | POINT F | 8:05 | 8:06 | POINT C | 8:13 | — |
| TRAIN 3 | TRAIN | POINT A | 7:49 | 7:50 | POINT B | 7:55 | 7:56 | POINT D | 8:06 | — | | | | | | |
| : | : | : | : | : | : | : | : | : | : | : | : | : | : | : | : | : |

TRAVEL DEMAND INFORMATION DB

2

208

| ID (201) | DEPARTURE TIME ZONE (202) | DEPARTURE POINT (203) | FINAL DESTINATION POINT (204) | NUMBER OF PEOPLE DEMANDING (205) | TYPE OF DEMAND (206) | ROUTE SELECTION CONDITION (207) |
|---|---|---|---|---|---|---|
| 1 | 7:30 − 7:35 | POINT A | POINT C | 1000 | PREDICTION | INITIAL VALUE |
| 2 | 7:30 | POINT A | POINT D | 5 | ACTUAL INPUT | REQUIRED TIME: 0.7, TRANSFER COST: 0.3, ADDITIONAL FARE : 500 YEN OR LESS |
| 3 | 7:33 | POINT B | POINT C | 1 | ACTUAL INPUT | REQUIRED TIME: 1.0, ADDITIONAL FARE : 800 YEN OR LESS |
| : | : | : | : | : | : | : |

FIG. 6

TRAFFIC SERVICE CONGESTION INFORMATION DB

3

301 302

| NAME | CONGESTION RATE(%) |
| --- | --- |
| TRAIN 1 | 250 |
| TRAIN 2 | 200 |
| TRAIN 3 | 180 |
| : | : |

FIG. 8

TRAFFIC-JAM INFORMATION DB

4

401 402 403 404

| FRONT-END LOCATION | TAIL-END LOCATION | TRAFFIC-JAM LENGTH (km) | TRAVEL TIME (MINUTES) |
| --- | --- | --- | --- |
| POINT A | POINT B | 3.0. | 10.0 |
| POINT B | POINT E | 10.0 | 20.0 |
| : | : | : | : |

FIG. 9

SPECIAL TRAFFIC MEANS INFORMATION DB

5

501 502 503 504 505 506 507

| ID | TRANSPORTATION FACILITY | TYPE | DEPARTURE POINT | ARRIVAL POINT | OPERATION COST [¥/km] | OPERATION CONDITION |
|---|---|---|---|---|---|---|
| 1 | MOTORCOACH | ROAD | POINT A | POINT F | 450 | NUMBER OF USERS: 50 OR MORE<br>FARE INCOME: ¥10000 OR MORE |
| 2 | TAXI | ROAD | POINT A | POINT E | 500 | NUMBER OF USERS: 1 OR MORE<br>FARE INCOME: ¥2000 OR MORE |
| 3 | SHARED TAXI | ROAD | POINT A | POINT E | 500 | NUMBER OF USERS: 6 OR MORE<br>FARE INCOME: ¥2000 OR MORE |
| 4 | SPECIAL TRAIN | RAILWAY | POINT A | POINT D | 10000 | NUMBER OF USERS: 1000 OR MORE<br>FARE INCOME: ¥400000 OR MORE |
| : | : | : | : | : | : | : |

SPECIAL TRANSPORTATION FACILITY SPECIFICATION PROCESS

TRANSPORTATION SERVICE INFORMATION PROVIDING APPARATUS, AND TRANSPORTATION SERVICE INFORMATION PROVIDING METHOD

CROSS-REFERENCE TO RELATED APPLICATION

The present application claims priority upon Japanese Patent Application No. 2016-230279 filed on Nov. 28, 2016, which is hereby incorporated herein by reference.

BACKGROUND OF THE INVENTION

1. Field of the Invention

The present invention relates to a transportation service information providing apparatus, and a transportation service information providing method.

2. Related Art

In the field of providing transportation service, such as railway, bus, or taxi, transportation service is planned preliminarily or each time in accordance with demand (hereinafter, referred to as travel demand) of users who use such transportation services. Note that the aforementioned transportation service plan also involves plans to be prepared after having received a request from a user, such as dispatching a taxi, in addition to preliminarily prepared plans such as railway or bus operation plans.

Although transportation service is planned after having preliminarily predicted travel demand to some extent in order to perform efficient vehicle operation or prevent shortage of transportation capacity, timely actions are required in response to momentary situation taking future travel demands into account, in order to handle minor daily variation of demands or unexpected events such as operation failure.

As a related technique for taking such a measure, Japanese Patent Application Laid-Open Publication No. 2016-085734 (Patent Literature 1) has disclosed therein a means for calculating a set of vehicle services to be provided for boarding requests, on the basis of prediction of future demand for respective services and probability of respective services being selected by passengers. Accordingly, Patent Literature 1 suggests that it is possible to present information (options) relating to transportation services which may improve the sum of the profit of transportation service provider and the degree of user satisfaction, taking into account future travel demand.

SUMMARY OF THE INVENTION

Patent Literature 1, however, is intended for a transportation service that covers the entire route from the input departure point to the arrival point by one and the same vehicle, and does not assume a transportation service that covers a part of the route from the departure point to the arrival point by another vehicle. Accordingly, when an unexpected event occurs in transportation over a medium or long distance, there is provided only information of a transportation service that covers the entire route of the transportation with one and the same vehicle (e.g., special transportation service). Practically, a special transportation service often turns out to be a small- or medium-scale transportation means such as taxi, shared taxi, or bus, and therefore the cost required for transportation over a medium or long distance turns out to be high with the technology disclosed in Patent Literature 1.

The present invention, which has been made in view of the aforementioned circumstances, is intended to provide a transportation service information providing apparatus and a transportation service information providing method for providing useful transportation service information.

An aspect of the present invention for solving the aforementioned problem is a transportation service information providing system having a processor and a memory for providing information on transportation from a departure point to a destination point by a transportation facility, the system including: a transportation facility specification unit configured to specify a transportation facility that performs transportation from the departure point to the destination point; a special transportation facility extraction unit configured to extract a special transportation facility which is a different transportation facility from the specified transportation facility and performs transportation for a partial section in the transportation from the departure point to the destination point; a special transportation facility specification unit configured to specify the special transportation facility as the transportation facility to be used for transportation from the departure point to the destination point, in a case where the extracted special transportation facility satisfies predetermined conditions relating to the transportation for the partial section; and a special transportation facility information output unit configured to output information on the specified special transportation facility.

According to the present invention, it is possible to provide useful transportation service information.

Problems, configurations, and effects other than those mentioned above will be apparent via description of the following embodiments.

BRIEF DESCRIPTION OF THE DRAWINGS

FIG. 5 illustrates an example of a transportation service plan information DB 1;

FIG. 6 illustrates an example of a travel demand information DB 2;

FIG. 8 illustrates an example of a traffic service congestion information DB 3;

FIG. 9 illustrates an example of a traffic-jam information DB 4;

FIG. 10 illustrates an example of a special traffic means information DB 5;

DETAILED DESCRIPTION OF THE INVENTION

Hereinafter, embodiments for carrying out the present invention will be described, referring to drawings.

<System Configuration>

A transportation service information providing system according to the present embodiment is applied in a transportation network including at least one or more types of transportation facilities (e.g., traffic vehicles, such as train, subway, airplane, and ship).

Although each of such transportation facilities (hereinafter, referred to as normal transportation facility) usually transports its users from a predetermined departure point to a destination point, an alternative or additional transportation facility (hereinafter, referred to as a special transportation facility, including, for example, special train, shared taxi, specially operated bus, or the like) will be operated in case of a change in the users' usage form or other factors (when, for example, a large-scale event is being held, or an unexpected event such as a disaster or an accident has occurred, which is referred to below as service failure time).

A transportation service information providing system of the present embodiment provides information on such special transportation facilities to business operators of respective transportation facilities or special transportation facilities (railway companies, bus companies, taxi companies, or the like), and users (passengers or the like) of respective transportation facilities or special transportation facilities.

Figure 1:
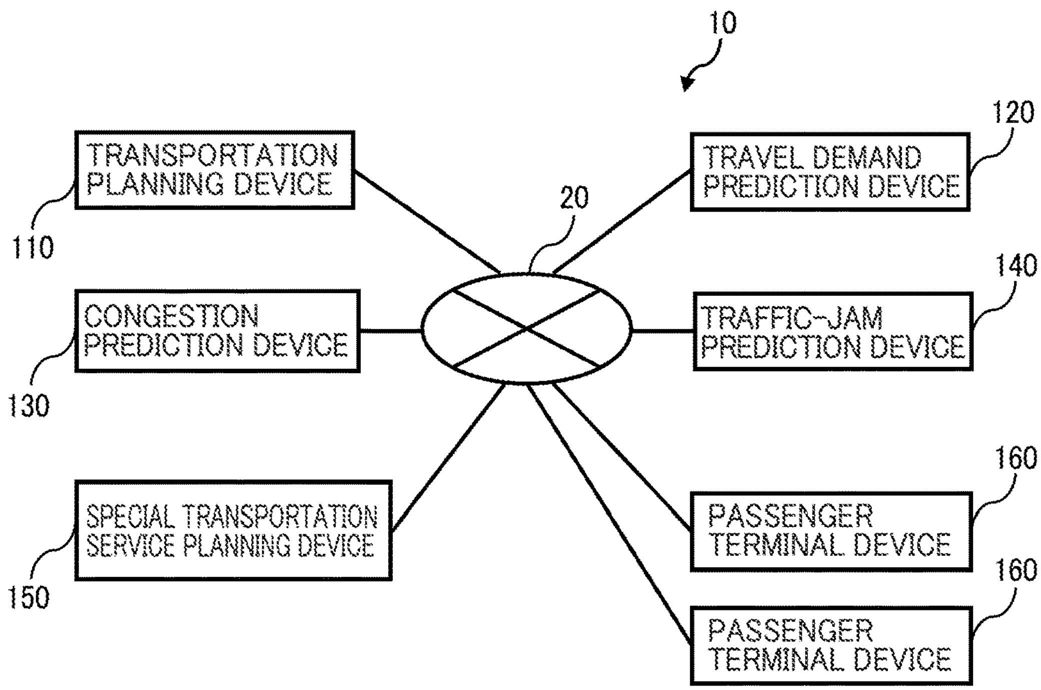
FIG. 1 illustrates an exemplary configuration of a transportation service information providing system 10 according to the present embodiment.

FIG. 1 illustrates an exemplary configuration of a transportation service information providing system 10 according to the present embodiment. As illustrated in the drawing, the transportation service information providing system 10 includes: a transportation planning device 110 which is an information processing device (computer) installed in a management company, an operation company, or the like, of each transportation facility; at least one or more passenger terminal devices 160 which are information processing devices (computer, such as a tablet terminal) used by users and the like utilizing respective transportation facilities, a travel demand prediction device 120, a congestion prediction device 130, a traffic-lam prediction device 140, and a special transportation service planning device 150.

Target transportation facilities of the transportation service information providing system 10 of the present embodiment include transportation facilities that perform transportation according to a predetermined operation schedule (hereinafter, referred to as regular service or traffic service, such as train or bus), and transportation facilities that do not have a predetermined operation schedule (hereinafter, referred to as irregular service, such as taxi).

The travel demand prediction device 120, the congestion prediction device 130, the traffic-jam prediction device 140, and the special transportation service planning device 150 are information processing devices (computers) managed by a management company or an operation company of a transportation facility, for example.

Respective information processing devices in the transportation service information providing system 10 are communicably connected via a communication network 20. The communication network 20 is a wired or wireless communication network, such as a LAN (Local Area Network), a WAN (Wide Area Network), the Internet, a dedicated line, a mobile telephone network, or optical fiber.

Note that, all or a part of the information processing devices other than the special transportation service planning device 150 may be configured as a single information processing device, in accordance with an operation form of the transportation service information providing system 10, target transportation facilities of the transportation service information providing system 10, or the like.

Figure 2:
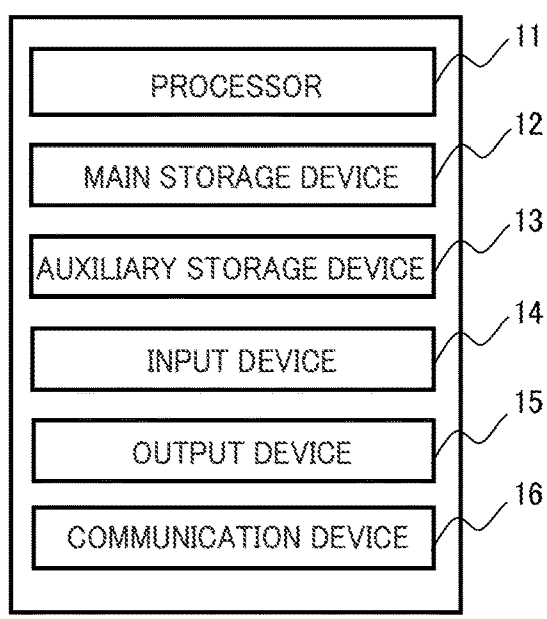
FIG. 2 illustrates an exemplary hardware configuration of each information processing device in the transportation service information providing system 10.

FIG. 2 illustrates an exemplary hardware configuration of each information processing device in the transportation service information providing system 10. As illustrated in the drawing, each information processing device includes a processor 11 having a CPU (Central Processing Unit) and the like, a main storage device 12, such as a RAM (Random Access Memory), a ROM (Read Only Memory), or an NVRAM (Non-Volatile RAM), an auxiliary storage device 13 having a storage device, such as a hard disk (Hard Disk Drive), or an SSD (Solid State Drive), an input device 14 having a keyboard, a mouse, a touch panel or the like, an output device 15 having a monitor (display) or the like, and a communication device 16, such as an NIC (Network Interface Card), which communicates with other information processing devices.

<Functions>

Next, there will be described functions included in respective information processing devices.

Figure 3:
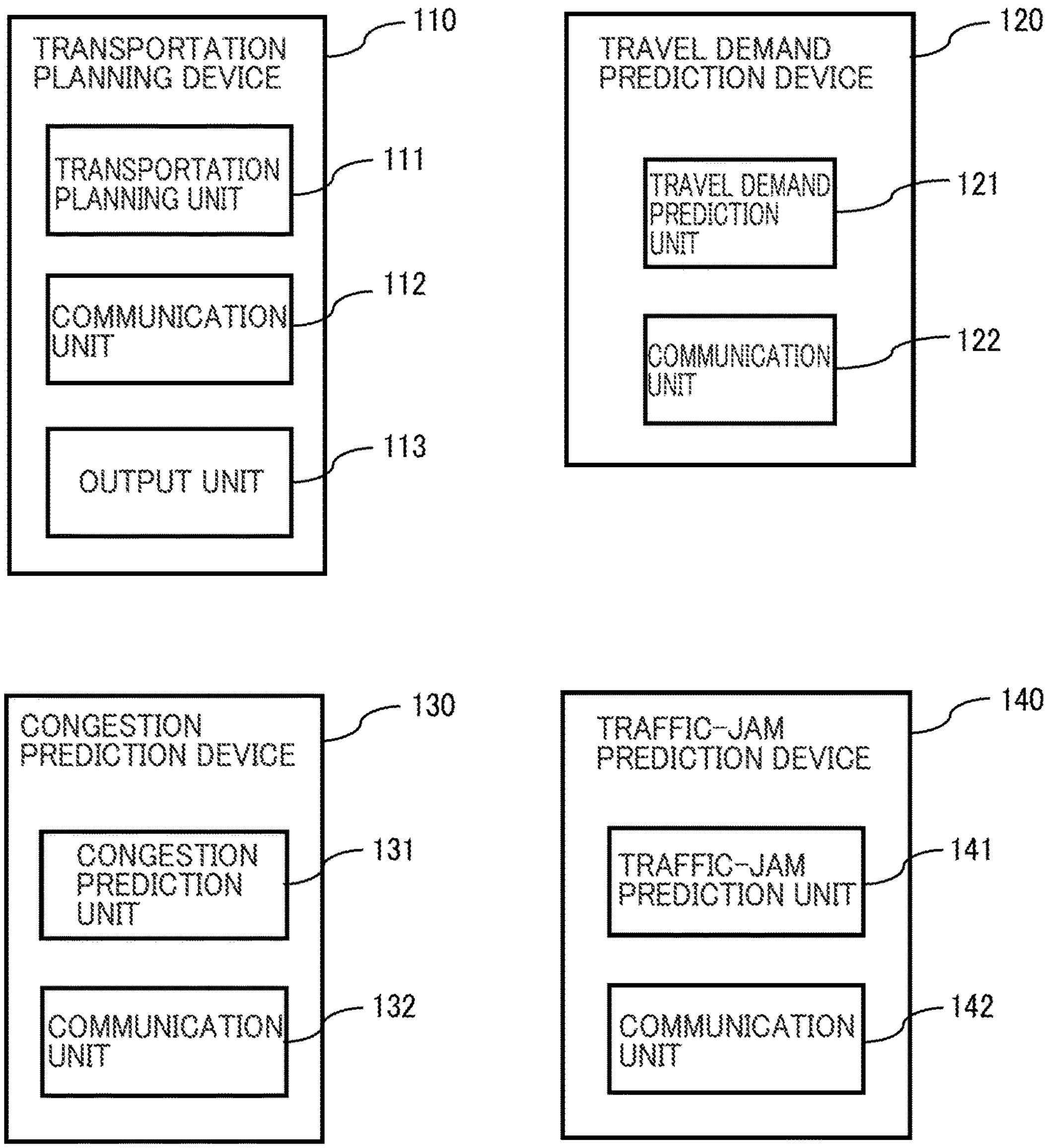
FIG. 3 illustrates an exemplary function included in each information processing device of a transportation planning device 110, a travel demand prediction device 120, a congestion prediction device 130, and a traffic-lam prediction device 140.

FIG. 3 illustrates an exemplary function included in each information processing device of the transportation planning device 110, the travel demand prediction device 120, the congestion prediction device 130, and the traffic-jam prediction device 140. Among these, the transportation planning device 110 includes a transportation planning unit 111, a communication unit 112, and an output unit 113 as illustrated in the drawing.

The transportation planning unit 111 has stored therein information (hereinafter, referred to as transportation service plan information) on operation schedules of each transportation facility (normal transportation facility). The transportation service plan information includes not only information on the present operation schedule, but also information on a future operation schedule predicted from the information on the past or present operation schedule.

Note that, it is assumed below that a "transportation facility" refers to a normal transportation facility unless otherwise stated.

The communication unit 112 communicates with other information processing devices. For example, the transportation service plan information is transmitted to the special transportation service planning device 150 via the communication unit 112. The output unit 113 outputs information such as transportation service plan information.

The travel demand prediction device 120 includes a travel demand prediction unit 121 and a communication unit 122.

The travel demand prediction unit 121 has stored therein information on use situation of users of the transportation facilities (hereinafter, referred to as travel demand information). The travel demand information, including information on the number of people who have used transportation facilities, is generated, on the basis of the use history of tickets, IC cards, or the like. The travel demand information includes not only information on the present use situation, but also information on the future use situation predicted from information on the past or present use situation.

The communication unit 122 communicates with other information processing devices. For example, the travel demand information is transmitted to the special transportation service planning device 150 via the communication unit 122.

The congestion prediction device 130 includes a congestion prediction unit 131 and a communication unit 132.

The congestion prediction unit 131 has stored therein information on congestion rate of regular services (e.g., occupancy of a train), out of the information on congestion of respective transportation facilities (hereinafter, referred to as congestion information). Note that, the congestion prediction unit 131 has stored therein not only the congestion rates of transportation facilities operated in the past or currently being operated, but also information on congestion rates of transportation facilities in a predetermined future time zone predicted from such congestion rates.

The communication unit 132 communicates with other information processing devices. For example, traffic service congestion information calculated by the congestion prediction unit 131 is transmitted to the special transportation service planning device 150 via the communication unit 132.

The traffic-jam prediction device 140 includes a traffic-jam prediction unit 141 and a communication unit 142.

The traffic-jam prediction unit 141 has stored therein information on backup of an irregular service (e.g., a traffic-jam section length of a road, or travel speed in a traffic-jam section of a road), out of traffic-jam information. Note that the traffic-jam prediction unit 141 has stored therein not only the past or present traffic jam, but also information on traffic jam over a predetermined future time zone predicted from the past or present traffic jam.

The communication unit 142 communicates with other information processing devices. For example, traffic-jam information calculated by the traffic-jam prediction unit 141 is transmitted to the special transportation service planning device 150 via the communication unit 142.

Figure 4:
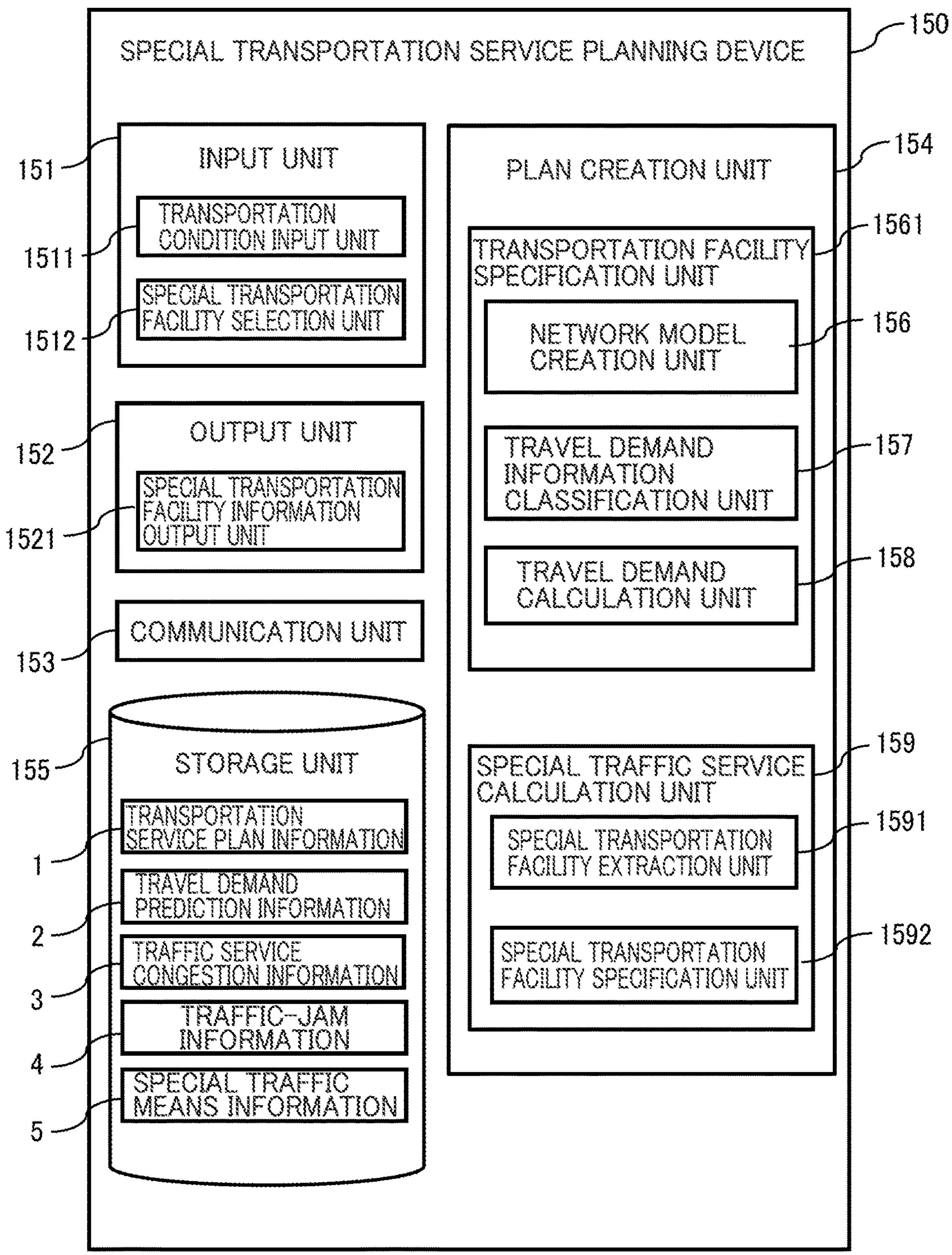
FIG. 4 illustrates an exemplary function included in a special transportation service planning device 150.

FIG. 4 illustrates an exemplary function included in the special transportation service planning device 150. As illustrated in the drawing, the special transportation service planning device 150 includes an input unit 151, an output unit 152, a communication unit 153, a plan creation unit 154, and a storage unit 155.

The input unit 151 accepts input of information from a user. The input unit 151 includes a transportation condition input unit 1511 and a special transportation facility selection unit 1512.

The transportation condition input unit 1511 accepts input of conditions relating to the departure point, the destination point, and a time zone of the transportation, and optionally, accepts input of conditions relating to at least any of a via-point between the departure point and the destination point, cost relating to transportation from the departure point to the destination point, time required for transportation from the departure point to the destination point, and time required for transfer at the via-point.

The special transportation facility selection unit 1512 accepts selection of a special transportation facility extracted by a special transportation facility extraction unit 1591 described below.

The storage unit 155 acquires transportation service plan information from the transportation planning device 110 and stores the acquired transportation service plan information in a transportation service plan information DB 1 (DB: database, the same goes below).

<Transportation Service Plan Information DB 1>

Here, the transportation service plan information DB 1 will be described.

FIG. 5 illustrates an example of the transportation service plan information DB 1. As illustrated in the drawing, the transportation service plan information DB 1 includes at least one or more records having respective items of: a name 101 for storing information (name, number, symbol, or the like) specifying a transportation facility (normal transportation facility); a traffic vehicle 102 for storing information indicating the type of the transportation facility specified in the name 101 (e.g., motorcoach, taxi, shared taxi, train); and at least one or more departure-and-arrival items 106.

Among these, the departure-and-arrival item 106 has respective items of: a point 103 for storing information specifying a departure point of the transportation facility specified in the name 101, via-points (passing points, or stopover points) of the transportation facility specified in the name 101, or the destination point (final arrival point) of the transportation facility specified in the name 101; an arrival time 104 for storing information on a point of time when the transportation facility specified in the name 101 passes or arrives at the point specified in the point 103; and a departure time 105 for storing information on a point of time when the transportation facility specified in the name 101 departs from the point specified in the point 103.

As thus described, the transportation service plan information DB 1 is a database having stored therein points such as stations, bus stops, or taxi stands where passengers get on or off a transportation facility such as railway, bus, or taxi, and points of time when the transportation facility arrives at, departs from, or passes by, the point. Note that, of the points of time of the arrival, departure or passing by, the point of time of the day is a point of time estimated, on the basis of the present service situation and prediction of a future service situation.

Next, the storage unit 155 acquires travel demand information from the travel demand prediction device 120 and stores the acquired travel demand information in a travel demand information DB 2.

<Travel Demand Information DB 2>

Here, the travel demand information DB 2 will be described.

FIG. 6 illustrates an example of the travel demand information DB 2. As illustrated in the drawing, the travel demand information DB 2 includes at least one or more records having respective items of: an ID 201 for storing information specifying a transportation section (combination of a departure point and a destination point); a departure time zone 202 for storing information of the time zone in which transportation in the transportation section specified in the ID 201 is started (hereinafter, referred to as departure time zone); a departure point 203 for storing the departure point in the transportation section specified in the ID 201; a final destination point 204 for storing the destination point in the transportation section specified in the ID 201; a number-of-people-demanding 205 for storing an estimated value of the number of people using a transportation facility (hereinafter, referred to as number of travel demands) in the transportation section specified in the ID 201; a type-of-demand 206 for storing information indicating whether the number of people specified in the number-of-people-demanding 205 is a predicted value (prediction) calculated by the travel demand prediction device 120 or the like, or a predicted value ("actual input") input by a user to the passenger terminal device 160 or the like; and a route selection condition 207 for storing information of conditions (hereinafter, referred to as transportation condition) relating to transportation from the departure point specified in the departure point 203 to the destination point specified in the final destination point 204. Note that, the departure point 203 and the final destination point 204 store information corresponding to the point 103 specified in the transportation service plan information DB 1.

For example, a record 208 illustrated in the drawing indicates that the number of people using transportation from a departure point "point A" to a destination point "point C" (number of travel demands) is estimated to be "1000" in a time zone of "7:30 to 7:35".

The transportation condition specified in the route selection condition 207 includes respective items of, for example, the time required for transportation from a departure point to a destination point (required time), cost for change of transportation facilities, an additional fare required for the user to pay when using a special transportation facility, and degrees of importance or reference values of the respective items as well. Note that, when no transportation condition is specified in the route selection condition 207, a condition preliminarily stored in the special transportation service planning device 150 is applied as the transportation condition.

As thus described, the travel demand information DB 2 has stored therein, for each transportation from a departure point to a destination point, information of the number of people using the transportation (number of travel demands).

Note that, respective records of the travel demand information DB 2 may be generated by the travel demand prediction unit 121 of the travel demand prediction device 120 as described above, or may be updated by an input unit 161 of the passenger terminal device 160 in a manner such as accepting input of travel demand information from a user of a transportation facility (e.g., accepting via a travel demand information input screen described below) and transmitting the accepted travel demand information to the special transportation service planning device 150 via a communication unit 163.

<Travel Demand Information Input Screen 1000>

Figure 7:
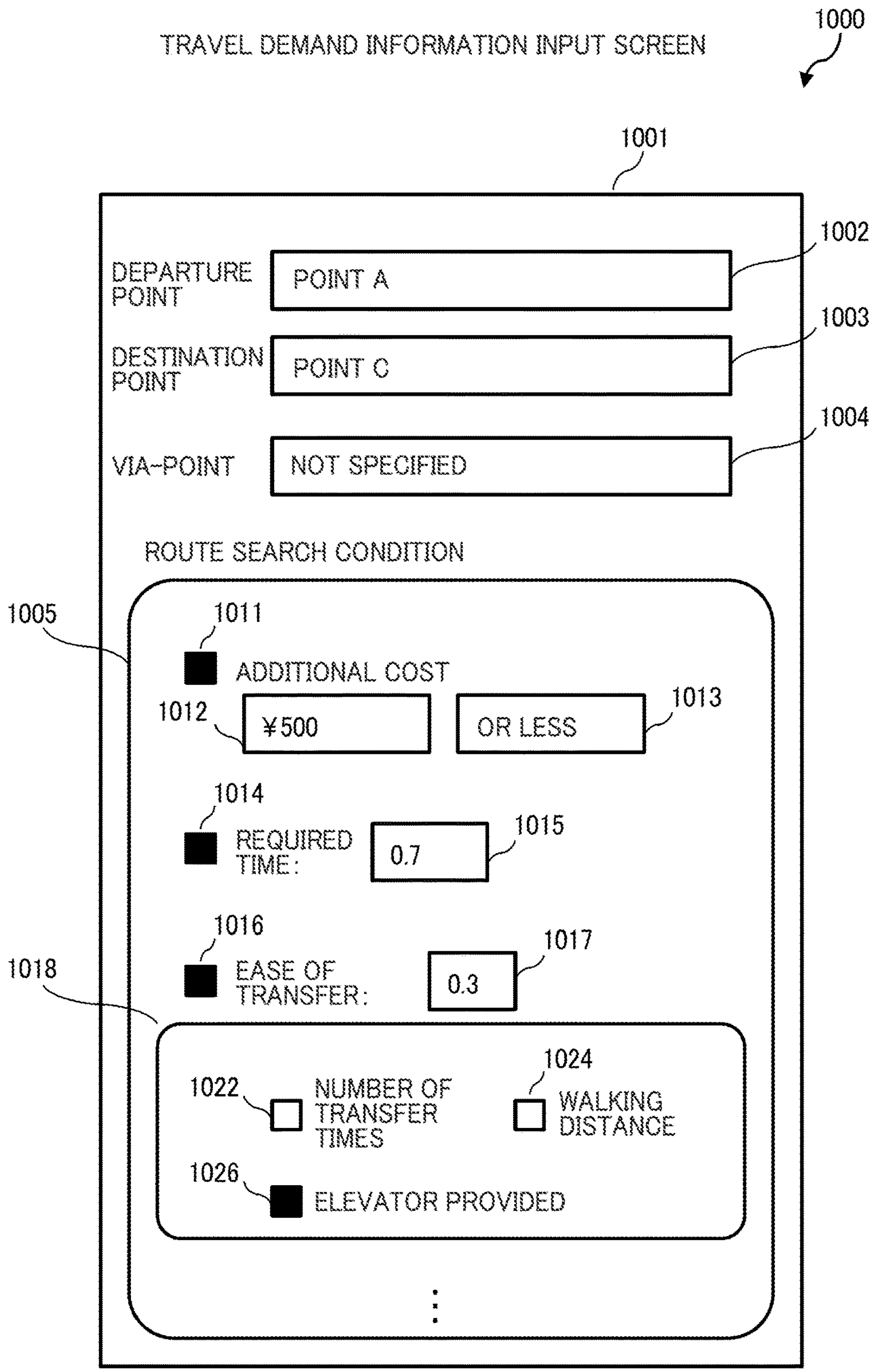
FIG. 7 illustrates an example of a travel demand information input screen 1000.

Here, FIG. 7 illustrates an exemplary screen (hereinafter, referred to as travel demand information input screen) for inputting information on travel demand information, which is to be displayed on the passenger terminal device 160. A travel demand information input screen 1000 is a screen to be displayed by a user's performing a predetermined input operation on the passenger terminal device 160 when, for example, using a transportation facility or a special transportation facility.

As illustrated in the drawing, the travel demand information input screen 1000 has respective items of: a screen frame 1001, a departure point input 1002, a destination point input 1003, a via-point input 1004, and a route search condition input 1005.

Among these, the departure point input 1002 accepts input of information specifying the departure point (e.g., information such as name or location). The destination point input 1003 accepts input of information specifying a destination point (e.g., information such as name or location). The via-point input 1004 accepts input of information specifying a via-point (e.g., information such as name or location). Note that, when not specifying any via-point, there will be accepted input of characters or symbols such as "not specified" indicating no via-point will be specified.

The route search condition input 1005 optionally accepts input of information on a transportation condition. Specifically, the route search condition input 1005 has an additional cost check button 1011, an additional cost reference value input field 1012, an additional cost condition input field 1013, a required-time check button 1014, a required-time input field 1015, a transfer check button 1016, a transfer importance input field 1017, and a transfer evaluation item input field 1018.

The additional cost check button 1011 accepts selection of whether or not to include an additional cost to be paid as a fare of a special transportation facility in the transportation condition. When the additional cost is to be included in the transportation condition, the additional cost reference value input field 1012 accepts input of a reference value, such as the upper limit value or the lower limit value of the additional cost. When the additional cost is to be included in the transportation condition, the additional cost condition input field 1013 accepts input of an inequality sign for specifying the transportation condition.

The required-time check button 1014 accepts selection of whether or not to include required time in the transportation condition. When required time is to be included in a condition, the required-time input field 1015 accepts input of a relative importance against items of other conditions.

The transfer check button 1016 accepts input of selection of whether or not to include ease of transfer in the transportation condition. When ease of transfer is to be included in the condition, the transfer importance input field 1017 accepts input of relative importance against items of other conditions.

The evaluation item input field 1018 accepts selection of an item relating to whether or not to include ease of transfer in the transportation condition. Specifically, the evaluation item input field 1018 has respective items of: a number-of-transfer-times check 1022 relating to the number of transfer times of transportation facilities specified when ease of transfer is to be included in the transportation condition; a walking-distance check 1024 specifying a walking distance when ease of transfer is to be included in the transportation condition; and an elevator check 1026 specified on the premise that an elevator is provided at the transfer point, when ease of transfer is to be included in the transportation condition.

Next, the storage unit 155 illustrated in FIG. 4 acquires congestion information from the congestion prediction device 130 and stores the acquired congestion information in a traffic service congestion information DB 3.

<Traffic Service Congestion Information DB 3>

Here, the traffic service congestion information DB 3 will be described.

FIG. 8 illustrates an example of the traffic service congestion information DB 3. As illustrated in the drawing, the traffic service congestion information DB 3 includes at least one or more records having respective items of: a name 301 for storing information specifying a traffic service (e.g., name and number); and a congestion rate 302 for storing a predicted value of congestion of the traffic service specified in the name 301.

As thus described, the traffic service congestion information DB 3 is a database having stored therein predicted values of congestion for respective traffic services defined in the transportation service plan information DB 1, including, for example, numbers, symbols, or names that uniquely specify traffic services, and predicted values of congestion of the traffic services.

The storage unit 155 acquires congestion information from the traffic-jam prediction device 140 and stores the acquired congestion information in a traffic-jam information DB 4.

<Traffic-Jam Information DB 4>

Here, the traffic-jam information DB 4 will be described.

FIG. 9 illustrates an example of the traffic-jam information DB 4. As illustrated in the drawing, the traffic-jam information DB 4 includes at least one or more records having respective items of:

a front-end location 401 for storing information indicating the location of the front end of a traffic jam (e.g., name and location information of the point); a tail-end location 402 for storing information indicating the location of the tail end of the traffic jam (e.g., name and location information of the point); a traffic-jam length 403 for storing information indicating the length of the traffic jam; and a travel time 404 for storing information indicating the time required for passing a traffic-jam section.

As thus described, the traffic-jam information DB 4 is a database having stored therein information of the present traffic jam of a road being used by an irregular service and future prediction information of traffic jam.

The storage unit 155 has stored therein a special traffic means information DB 5.

<Special Traffic Means Information DB 5>

Here, the special traffic means information DB 5 will be described.

FIG. 10 illustrates an example of the special traffic means information DB 5. As illustrated in the drawing, the special traffic means information DB 5 includes at least one or more records having respective items of: an ID 501 for storing information specifying a special transportation facility which is operable in case of service failure; a traffic vehicle 502 for storing information indicating the type of the special transportation facility specified in the ID 501 (e.g., motorcoach, taxi, shared taxi, or special train); a type 503 for storing information indicating the type of infrastructure used by the special transportation facility specified in the ID 501 (in the present embodiment, a type is classified into "road" and "others", and, in the case of "others", a transportation method such as "railway" or "airplane" is stored as necessary); a departure point 504 for storing information specifying the departure point of the special transportation facility specified in the ID 501; an arrival point 505 for storing information specifying the destination point of the special transportation facility specified in the ID 501; operation cost 506 for storing information on the unit cost to be borne by each transportation facility when operating the special transportation facility specified in the ID 501; and an operation condition 507 for storing information relating to the condition for providing the special transportation facility specified in the ID 501 (e.g., the lower limit of the number of users of a special transportation facility, or the lower limit value of fare income. Hereinafter, referred to as special service provision condition). Note that the type 503 is referred to when calculating the required time of the special transportation facility.

For example, a record 508 illustrated in the drawing indicates that a "shared taxi", which is a special transportation facility using a "road", performs transportation from a departure point "point A" to a destination point "point E", and that, when the number of people using the special transportation facility is "six or more" and the fare income is "2000 yen or more", business operators of transportation facilities are able to provide the special transportation facility.

Next, as illustrated in FIG. 4, the plan creation unit 154 performs a process of specifying a special transportation facility to be operated. The plan creation unit 154 includes a transportation facility specification unit 1561 and a special traffic service calculation unit 159.

The transportation facility specification unit 1561 specifies a transportation facility that performs transportation from the departure point to the destination point.

For example, the transportation facility specification unit 1561 calculates a plurality of combinations of transportation facilities capable of performing transportation from the departure point to the destination point, calculates evaluation values relating to respective transportations by the calculated transportation facilities, and specifies the combination of transportation facilities with the highest calculated evaluation value as the transportation facilities that perform transportation from the departure point to the destination point.

Specifically, the transportation facility specification unit 1561 includes a network model creation unit 156, a travel demand information classification unit 157, and a travel demand calculation unit 158.

The network model creation unit 156 reads the transportation service plan information DB 1, the travel demand information DB 2, and the special traffic means information DB 5, and creates a network model (model representing the relations between departure points, via-points, destination points, and transportation facilities (including special transportation facilities) that perform transportation therebetween), on the basis of the databases which have been read.

The network model of the present embodiment is represented by nodes and links. Among these, a node indicates any of: a departure point, a destination point, or a via-point. A link indicates a transportation facility that performs transportation between the aforementioned points, and an evaluation value relating to the transportation facility. Note that the departure points, the destination points, and the via-points are stored in the transportation service plan information DB 1 and the travel demand information DB 2. A specific example of the network model will be described below.

Note that the aforementioned evaluation value refers to an evaluation value resulting from an evaluation with regard to required time, fare, or number of transfer times of transportation facilities, for example. It is assumed in the present embodiment that the evaluation value refers to an evaluation value relating to the time required by a transportation facility to perform transportation.

Note that the evaluation value is calculated, on the basis of a utility function or the like, which is generally used when evaluating a transportation facility in terms of items such as required-time and fare.

The travel demand information classification unit 157 compares respective records of the travel demand information DB 2, recognizes records having the same departure point, destination point, and route selection condition (transportation condition) and close departure times (e.g., records having the same departure point, destination point, and route selection condition (transportation condition), and departure times within 10 minutes) as a group (hereinafter, referred to as travel demand group), and classifies the records into respective recognized groups.

The travel demand calculation unit 158 extracts, for each travel demand group, a part of a network model (hereinafter, referred to as partial model) from the network model created by the network model creation unit 156. In other words, a partial model is a network model of a transportation route connecting a predetermined departure point and a destination point, within the network model covering the entire transportation network.

The travel demand calculation unit 158 then calculates an evaluation value of each transportation facility in the transportation from the departure point to the destination point, on the basis of the traffic service congestion information DB 3 and the traffic-jam information DB 4 (specifically, on the basis of the partial model). The travel demand calculation unit 158 then calculates the number of people using respective transportation facilities (number of travel demands), on the basis of the calculated evaluation value.

Next, the special traffic service calculation unit 159 calculates a special transportation facility, a transportation section covered by the special transportation facility, and information (hereinafter, referred to as special transportation service information) relating to the time zone in which the special transportation facility performs transportation, on the basis of the number of travel demands calculated by the travel demand calculation unit 158 and the special service provision conditions stored in the special traffic means information DB 5.

Specifically, the special traffic service calculation unit 159 includes the special transportation facility extraction unit 1591 and a special transportation facility specification unit 1592.

The special transportation facility extraction unit 1591 extracts a special transportation facility which is a different transportation facility from the specified transportation facility, and which covers a part of transportation from the departure point to the destination point.

The special transportation facility specification unit 1592 specifies the special transportation facility as the transportation facility to be used for transportation from the departure point to the destination point, when the extracted special transportation facility satisfies a predetermined condition (special service provision condition) relating to transportation in the partial section.

For example, the special transportation facility specification unit 1592 calculates the number of people using the extracted special transportation facility and, when the calculated number of people using the special transportation facility exceeds a predetermined value, specifies the special transportation facility as the transportation facility to be used for transportation from the departure point to the destination point. Specifically, for example, the special transportation facility specification unit 1592 specifies the transportation facility corresponding to the extracted special transportation facility, and estimates the number of people using the special transportation facility, on the basis of the number of people using the specified transportation facility.

In addition, for example, the special transportation facility specification unit 1592 specifies the transportation facility to be used for transportation from the departure point to the destination point, among the special transportation facilities selected by the special transportation facility selection unit 1512.

Next, the output unit 152 outputs the execution status or execution result, or the like of the process performed by the special transportation service planning device 150.

The output unit 152 includes a special transportation facility information output unit 1521. The special transportation facility information output unit 1521 outputs information on the special transportation facility specified by the transportation facility specification unit 1561.

For example, the special transportation facility information output unit 1521 outputs, for presentation to users, information on the special transportation facility specified, on the basis of the condition input to the transportation condition input unit 1511, to any one or more of: the output unit 152 of the special transportation service planning device 150; an output unit 162 of the passenger terminal device 160; or the output unit 113 of the transportation planning device 110.

For example, the special transportation facility information output unit 1521 outputs information on the special transportation facility in the time zone input to the transportation condition input unit 1511, among the special transportation facilities specified by the transportation facility specification unit 1561.

In addition, for example, the special transportation facility information output unit 1521 outputs information on the special transportation facility that satisfies the conditions input to the transportation condition input unit 1511.

The communication unit 153 communicates with other information processing devices.

<Network Model (Partial Model)>

Here, the network model in the present embodiment will be described, referring to a partial model.

Figure 11:
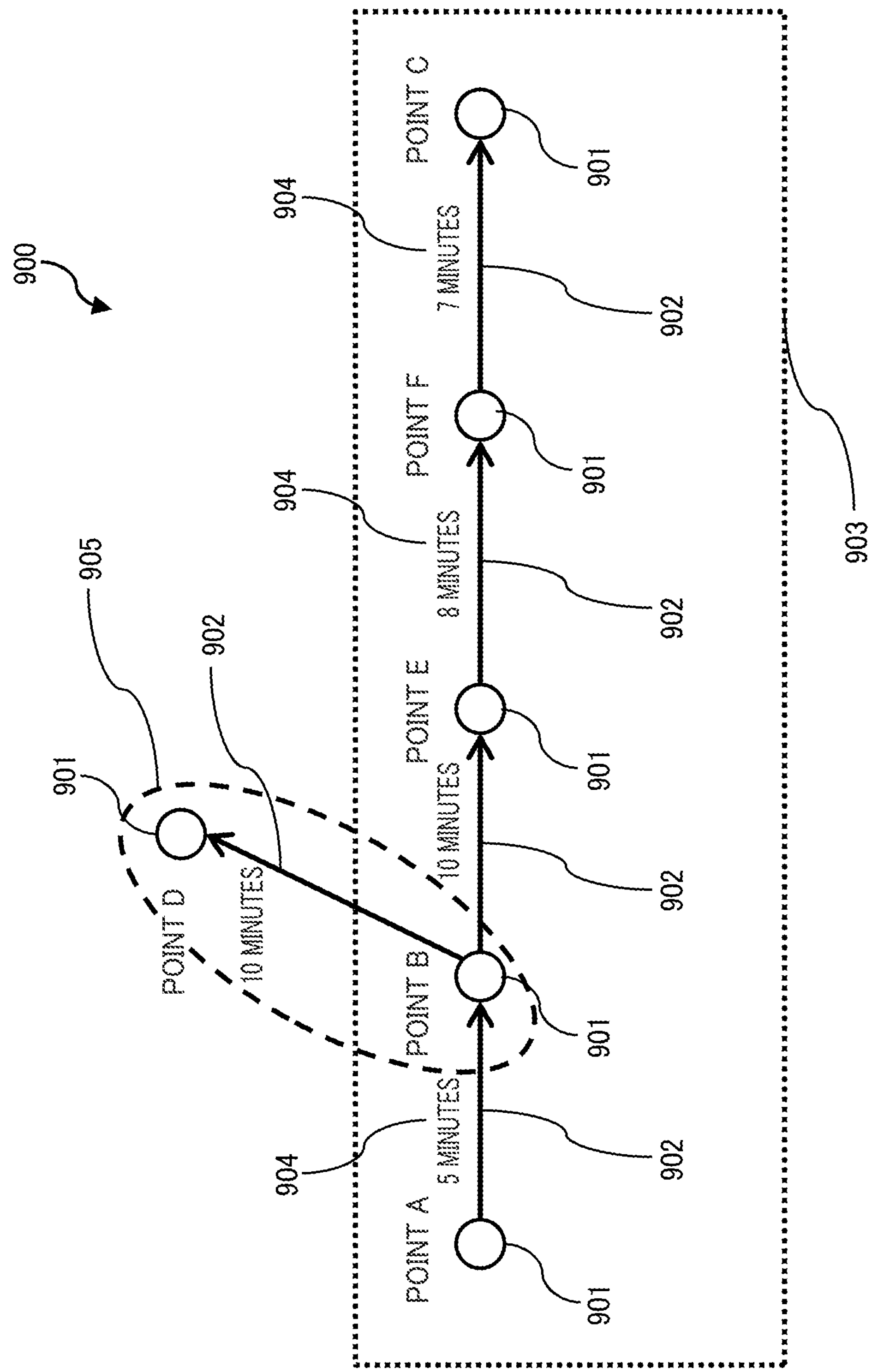
FIG. 11 illustrates an exemplary partial model generated, on the basis of the transportation service plan information DB 1 and a record 208 of the travel demand information DB 2.

FIG. 11 illustrates an example of a partial model 900 created, on the basis of the transportation service plan information DB 1 and a record 208 of the travel demand information DB 2, the partial model 900 indicating transportation from a departure point "point A" to a destination point "point C".

The partial model 900 includes nodes 901 and links 902. The nodes 901 indicate any of: departure points, destination points, or via-points between the departure points and the destination points. The links 902 represent information including transportation facilities that perform transportation between a departure point and a via-point, between via-points, or between a via-point and a destination point (i.e., connection relation between the nodes 901), and their evaluation values 904 as well. Note that the departure points, the destination points, and the via-points are stored in the transportation service plan information DB 1 and the travel demand information DB 2.

Further, the partial model 900 includes a model 903 relating to a transportation facility from a departure point to a destination point and a model 905 relating to a transportation facility from a via-point to another point. In the example of the drawing, a point D corresponds to the "another point". In other words, the point D is an "another point" which is not included in the transportation route (via-points) from the point A to the point C, but is reachable by a predetermined transportation facility from a point B which is a via-point therein.

Note that the evaluation value 904 of the link 902 is calculated by subtracting, from the arrival time at each point of each traffic service stored in the transportation service plan information DB 1, the departure time from an immediately preceding point, for example.

Figure 12:
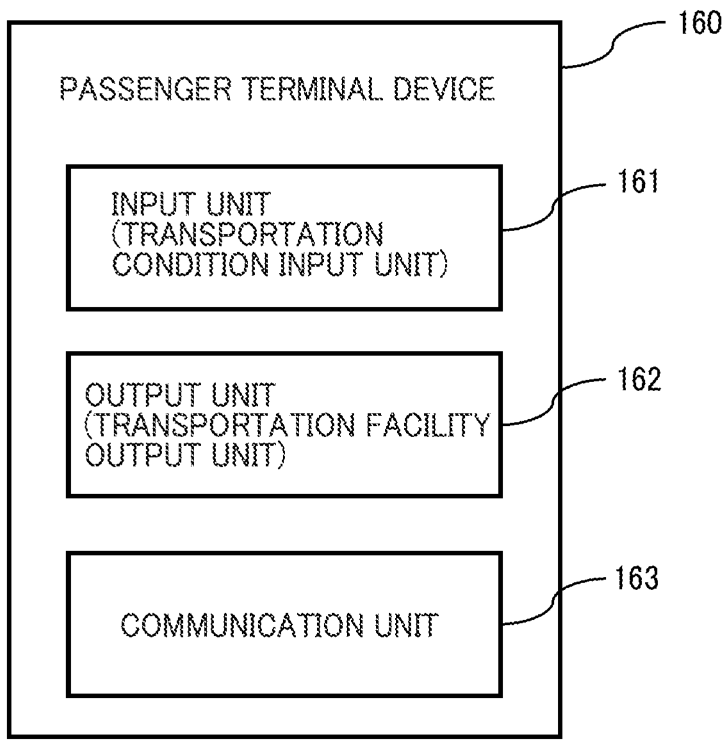
FIG. 12 illustrates an exemplary function included in a Passenger terminal device 160.

Next, FIG. 12 illustrates an exemplary function included in the passenger terminal device 160. As illustrated in the drawing, the passenger terminal device 160 includes the input unit 161, the output unit 162, and the communication unit 163.

The input unit 161 (transportation condition input unit) accepts input of conditions relating to the departure point, the destination point, and a time zone of the transportation, and optionally, accepts input of conditions relating to at least any of a via-point between the departure point and the destination point, cost relating to transportation from the departure point to the destination point; time required for transportation from the departure point to the destination point, and time required for transfer at the via-point.

The output unit 162 (transportation facility output unit) specifies the transportation facility that performs transportation from the input departure point to the input destination point in the input time zone, and outputs the specified transportation facility.

In addition, the transportation facility output unit specifies the transportation facility that satisfies the input conditions and performs transportation from the input departure point to the input destination point, and outputs the specified transportation facility.

The functions of respective information processing devices described above are realized by hardware of respective information processing devices or by the processors 11 of respective information processing devices which read and execute programs stored in the main storage devices 12 and the auxiliary storage devices 13.

<Special Transportation Facility Specification Process>

Figure 13:
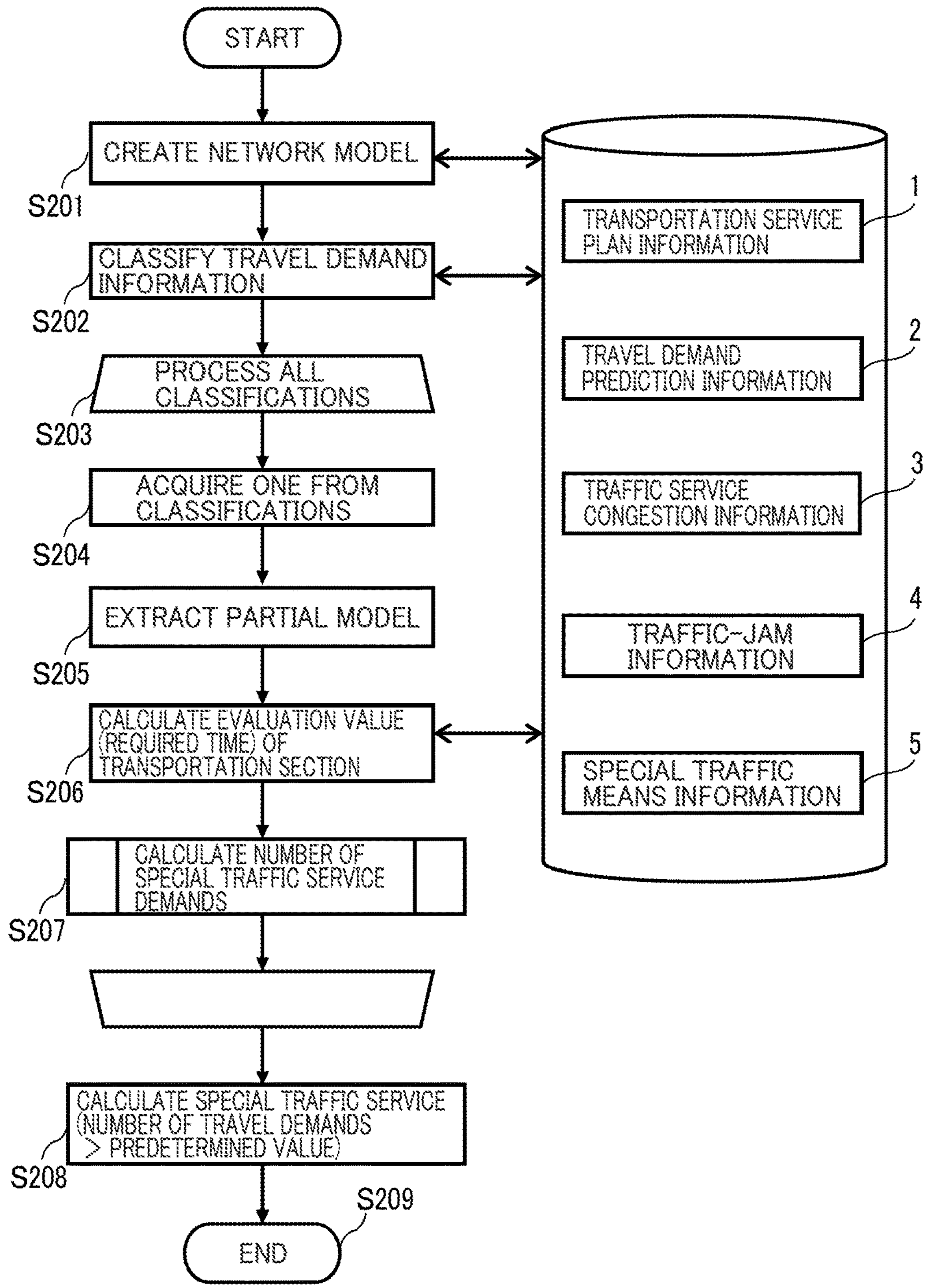
FIG. 13 is a flowchart illustrating a special transportation facility specification process.

FIG. 13 is a flowchart illustrating a process of specifying a special transportation facility (hereinafter, referred to as special transportation facility specification process), among the processes performed by the transportation service information providing system 10. The special transportation facility specification process is started when, for example, a predetermined input operation is performed on the special transportation service planning device 150.

As illustrated at S201 of the drawing, the network model creation unit 156 of the special transportation service planning device 150 first reads all of the entries of the transportation service plan information DB 1 and the travel demand information DB 2, and creates a network model representing the relations between the departure points, the via-points, the destination points, and the transportation facilities stored in the transportation service plan information DB 1 which has been read (S201).

The travel demand information classification unit 157 creates a travel demand group, on the basis of information read at S201 (S202).

The travel demand calculation unit 158 determines whether or not processes of S204 to S207 described below have been performed for all of the travel demand groups generated at S202. In a case where the aforementioned processes have already been performed for all of the travel demand groups, the travel demand calculation unit 158 performs the process of S208 and, when there exist unprocessed travel demand groups, the travel demand calculation unit 158 selects one of such travel demand groups (S204) and performs the process of S205.

At S205, the travel demand calculation unit 158 specifies a departure point, a destination point, and a via-point in a transportation section (hereinafter, referred to as processing section) in a travel demand group selected at S204 to generate (extract), from the network model created at S201, a partial model indicating all of the combinations of transportation means that perform transportation in the processing section (S205). Note that the combinations of transportation means that perform transportation in the processing section may be combinations of different types of transportation means (when, for example, transferring trains and busses), or may be combinations of different vehicles in the same type of transportation means (when, for example, transferring from a train of a certain route to a train of another route).

Next, the travel demand calculation unit 158 specifies all of the transportation facilities that perform transportation in the processing section and calculates an evaluation value of transportation to be performed by the specified transportation facility, on the basis of congestion information (S206). Specifically, for example, the travel demand calculation unit 158 extracts combinations of points in the processing section (e.g., between a departure point and a via-point, between a via-point and a via-point, or between a via-point and a destination point), on the basis of the traffic service congestion information DB 3 or the traffic-jam information DB 4, and the transportation service plan information DB 1, and calculates (updates) the evaluation value of each link in the partial model by calculating the times required between each of the extracted points, respectively.

Specification of the aforementioned transportation facility is performed, for example, by specifying, among transportation facilities that stop at a predetermined point, a transportation facility that arrives at the point after the start time of the departure time zone in the processing section, with an occupancy which is equal to or lower than a constant value at the point. In addition, specification of the aforementioned transportation facility may be performed, on the basis of specification to the passenger terminal device 160 by a user.

Here, an example of specifying a transportation facility and calculating an evaluation value will be described.

Figure 14:
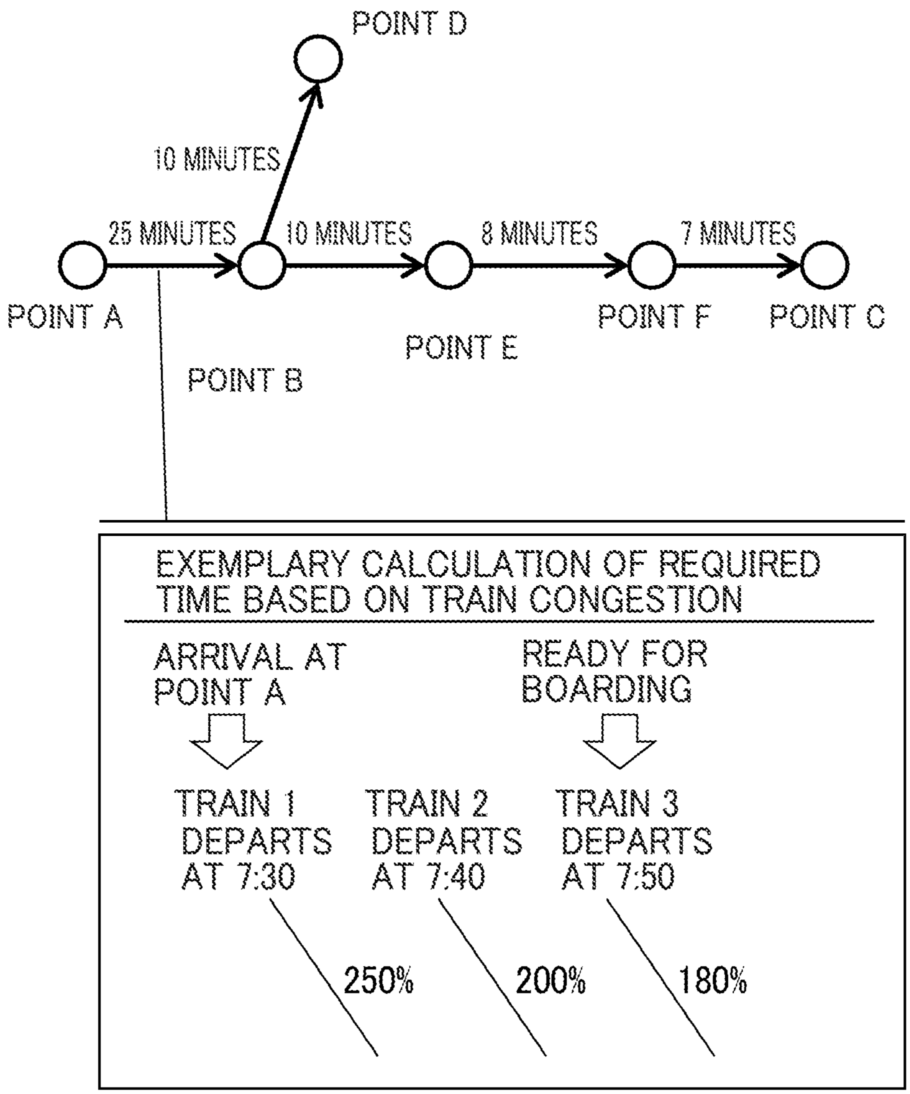
FIG. 14 illustrates an exemplary link calculated using the record 208 and its evaluation value.

FIG. 14 illustrates an exemplary link and its evaluation value calculated using the record 208. The drawing illustrates a case of specifying a transportation facility having a congestion rate of "less than 200%" and the earliest departure time, among a plurality of transportation facilities departing from the departure point. In other words, since the transportation facility of the record 208 has "point A" as the departure point and "7:30 to 7:35" as the departure time zone, all transportation facilities that depart from "point A" at or after 7:30 are specified (i.e., turn out to be candidate vehicles).

Accordingly, as illustrated in the drawing, respective congestion rates of the transportation facilities to be determined are: "250%" for "train 1", "200%" for "train 2", and "180%" for "train 3". Among these transportation facilities, "train 3" turns out to be the transportation facility satisfying the transportation condition indicated by the route selection condition 207 in the record 208 (congestion rate condition). Therefore, "train 3" is determined to be (one of) the transportation facilities for the processing section.

Then, assuming that the transportation facility that departs from "point A" has previously been "train 1", the departure time from "point A" is changed to "7:50" which is the departure time of "train 3" and is 20 minutes later than "7:30" which is the departure time of "train 1", whereby the users have to wait for another 20 minutes. Therefore, the previously set evaluation value of "5 minutes" is updated to "25 minutes".

Next, as illustrated in FIG. 13, the travel demand calculation unit 158 specifies a special transportation facility that satisfies a predetermined condition (e.g., condition relating to the number of people in demand, transportation condition, or special service provision condition), on the basis of the special traffic means information DB 5, and performs a process (hereinafter, referred to as number-of-travel demands calculation process) of estimating the number of people using respective transportation facilities (number of travel demands) which are available for transportation in the processing section, on the basis of the specified special transportation facility (S207). Details of the process will be described below. Subsequently, the process flow returns to S203.

The special traffic service calculation unit 159 specifies a transportation facility (including a special transportation facility) from the departure point to the destination point in the processing section, on the basis of the number of travel demands estimated at S207 and the special traffic means information DB 5.

Specifically, for example, the special traffic service calculation unit 159 specifies, among respective special transportation facilities, a special transportation facility for which the number of travel demands estimated at S207 exceeds a predetermined value (e.g., 50 users) as the transportation facility that performs transportation from the departure point to the destination point in the processing section.

The special traffic service calculation unit 159 then generates special transportation service information on the specified transportation facility, and outputs the generated special transportation service information via the output unit 152 or the output unit 162 of the passenger terminal device 160 (S208).

Thereafter, the special transportation facility specification process is terminated (S209).

<Special Transportation Facility Selection Screen 1700>

Here, the screen displayed on the passenger terminal device 160 at S208 will be described.

Figure 15:
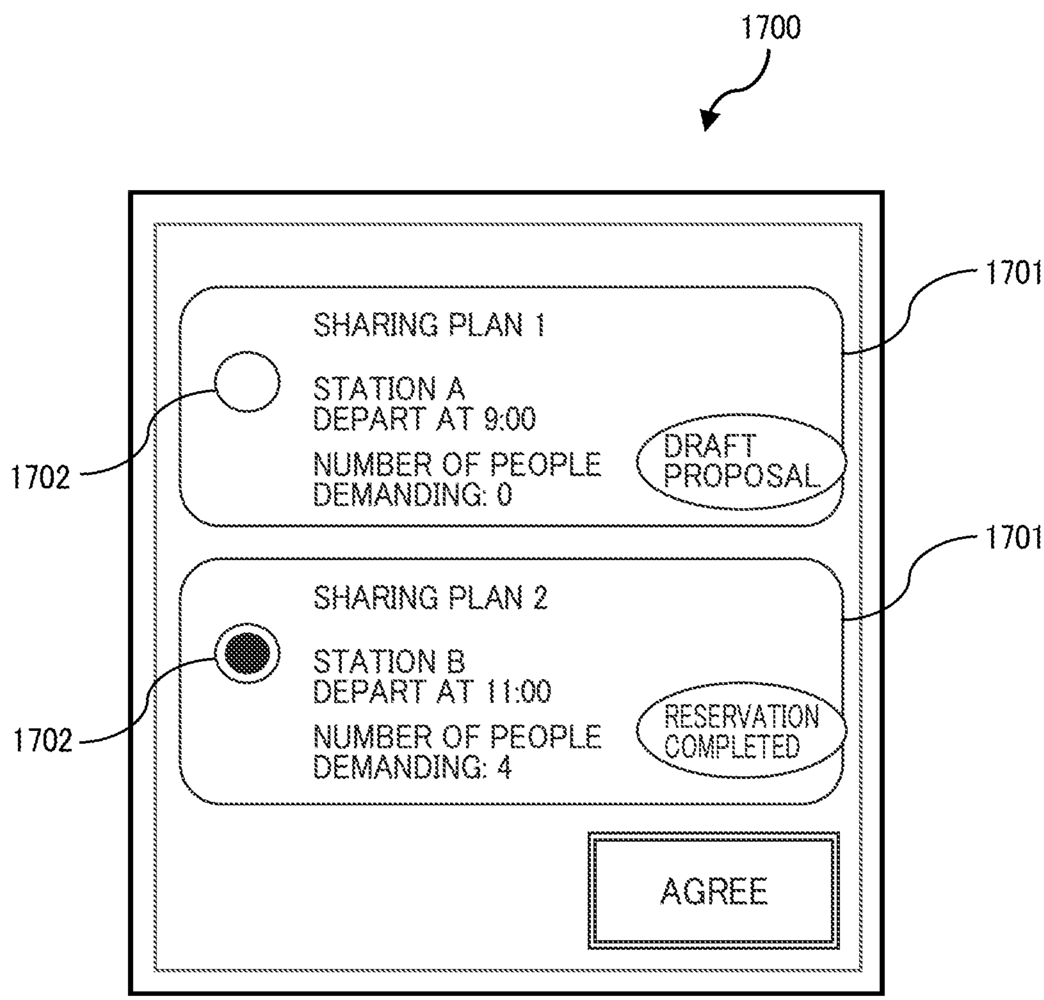
FIG. 15 illustrates an example of a special transportation facility selection screen 1700.

FIG. 15 illustrates an exemplary screen (hereinafter, referred to as special transportation facility selection screen) for selecting a special transportation facility to be displayed on the special transportation service planning device 150 or the passenger terminal device 160. As illustrated in the drawing, special transportation facility selection screen 1700 has special transportation facility display fields 1701 indicating a list of special transportation facilities specified by the process of S208, and selection fields 1702 each being associated with each of the special transportation facility display fields 1701.

The selection field 1702 is an input field for selecting a special transportation facility indicated by the corresponding special transportation facility display field 1701. Information on the selected special transportation facility is transmitted to the information processing device managed by a business operator of the transportation facility or the special transportation facility, for example, and the special transportation facility is actually operated, on the basis of the information.

<Number-of-Travel Demands Calculation Process S207>

Here, details of the number-of-travel demands calculation process will be described.

Figure 16:
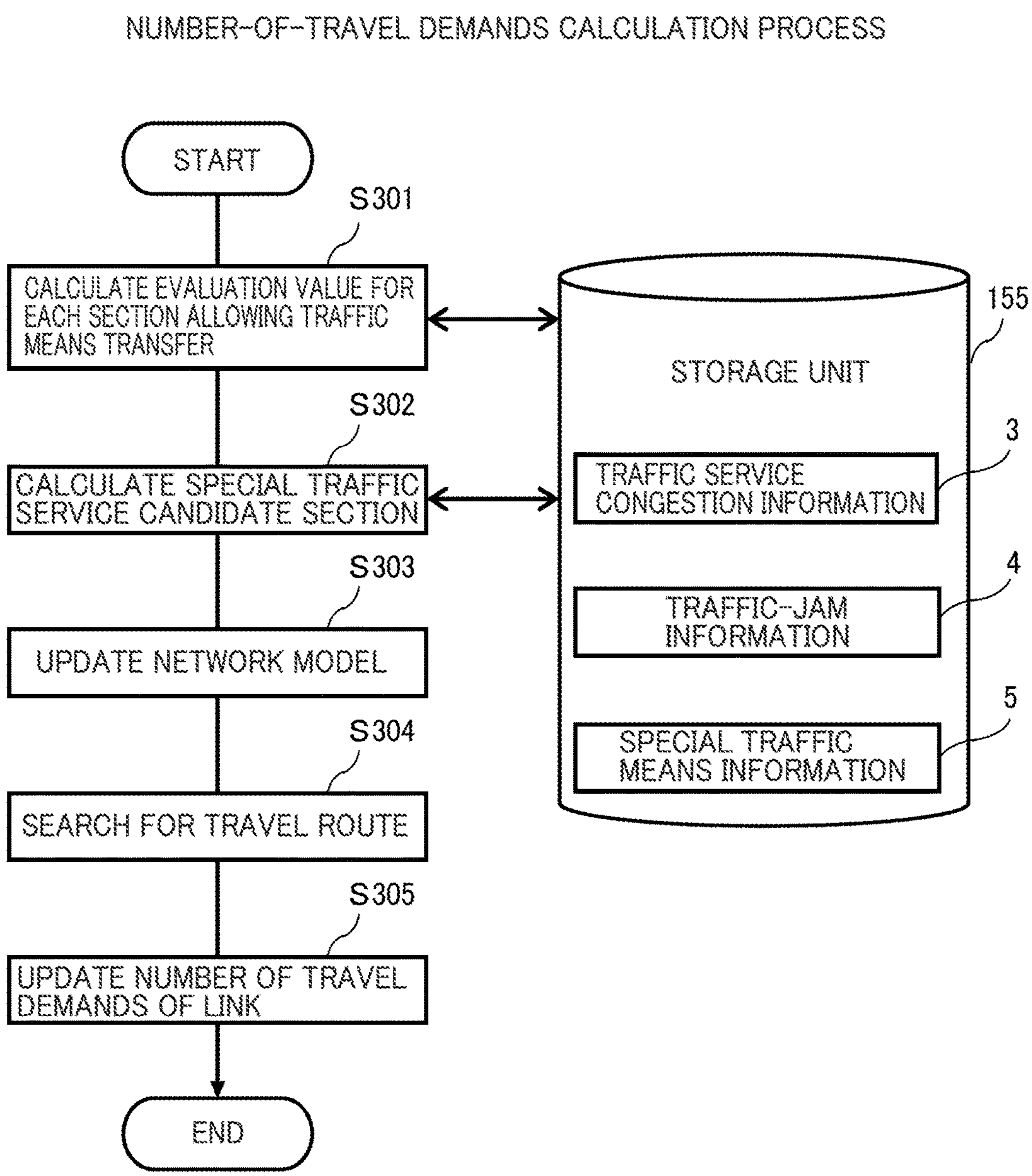
FIG. 16 is a flowchart illustrating details of a number-of-travel demands calculation process.

FIG. 16 is a flowchart illustrating details of the number-of-travel demands calculation process. As illustrated in the drawing, the travel demand calculation unit 158 first specifies all of the transportation facilities that perform transportation in the processing section, and calculates an evaluation value of transportation to be performed by the specified transportation facility (S301).

Specifically, for example, the travel demand calculation unit 158 acquires respective links in the partial model which has updated the links at S206. In addition, the travel demand calculation unit 158 extracts all of the nodes connected to a plurality of links, among the nodes in the partial model which has updated the links at S206, and calculates an evaluation value of a link (hereinafter, referred to as branch link) connecting all of the extracted nodes to a node linked to the node of interest. In other words, the travel demand calculation unit 158 specifies a plurality of types of transportation facilities that perform transportation from a via-point (branch originating transition point) branching to a plurality of different points (e.g., not only the link connecting "point B" and "point E" illustrated in FIG. 11, but also the link connecting "point B" and "point D" is specified).

Next, at S302, the travel demand calculation unit 158 calculates, on the basis of the special traffic means information DB 5, an evaluation value relating to transportation to be performed by a replacement or an additional special transportation facility of a normal transportation facility, which performs transportation in a partial section of the processing section (e.g., a special transportation facility that performs transportation in a section overlapping with a part of the processing section in which a normal transportation facility performs transportation).

The travel demand calculation unit 158 then compares the evaluation value for the partial section among the evaluation values calculated at S301 with the evaluation value calculated at S302, and specifies and stores the transportation facility having a higher evaluation value.

In other words, the travel demand calculation unit 158 specifies a section for which transportation by a special transportation facility has a better evaluation value than transportation by a normal transportation facility, and stores the special transportation facility that performs transportation in the specified section, together with the section.

Specifically, for example, the travel demand calculation unit 158 extracts, for each of the branch links, all of the special transportation facilities that perform transportation in the branch link, among respective special transportation facilities stored in the special traffic means information DB 5, and calculates the required time, fare, or the like, for performing transportation in the processing section using at least one or more of the extracted special transportation facilities and a normal transportation facility, as the evaluation value of the link. The travel demand calculation unit 158 then compares the calculated evaluation value of the link with the evaluation value of the branch link calculated at S301 and, when the calculated evaluation value of the link is higher, stores the extracted special transportation facility and the section (link).

Note that the evaluation value of a special transportation facility which uses a road (e.g., shared taxi) is calculated, on the basis of duration of road traffic jam. For example, in a case where the type of special transportation facility is "road" (e.g., the type 503 of the special traffic means information DB 5 is "road"), the evaluation value of transportation to be performed by the special transportation facility is a value stored in the travel time 404 of the traffic-jam information DB 4. Alternatively, in a case where the special transportation facility is a transportation facility that uses an infrastructure other than a road (e.g., the type 503 of the special traffic means information DB 5 is "railway"), the evaluation value is calculated, on the basis of a required time calculated, on the basis of transportation to be performed by a transportation facility stored in the transportation service plan information DB 1, or a preliminarily set required time.

Next, at S303, the travel demand calculation unit 158 stores the special transportation facility specified at S302 as a candidate transportation means to be used for transportation from the departure point to the destination point. Specifically, for example, the travel demand calculation unit 158 adds the link stored at S302 to the partial model updated at S206.

Next, at S304, the travel demand calculation unit 158 searches for an optimal transportation route in the processing section, on the basis of the special transportation facility specified at S303. Specifically, for example, the travel demand calculation unit 158 searches for a combination of links with the smallest total sum of evaluation values (i.e., the shortest required time), among the combinations of links from a node of the departure point to a node of the destination point, on the basis of evaluation values of respective links in the partial model generated at S303.

Note that a dynamic programming method or the like, for example, is used for the search of the transportation route. Additionally, in a case where a transportation condition is set for each transportation facility, a search is performed for a transportation route to be covered by a transportation facility satisfying the transportation condition.

Here, an exemplary search for a transportation route at S304 will be described.

Figure 17:
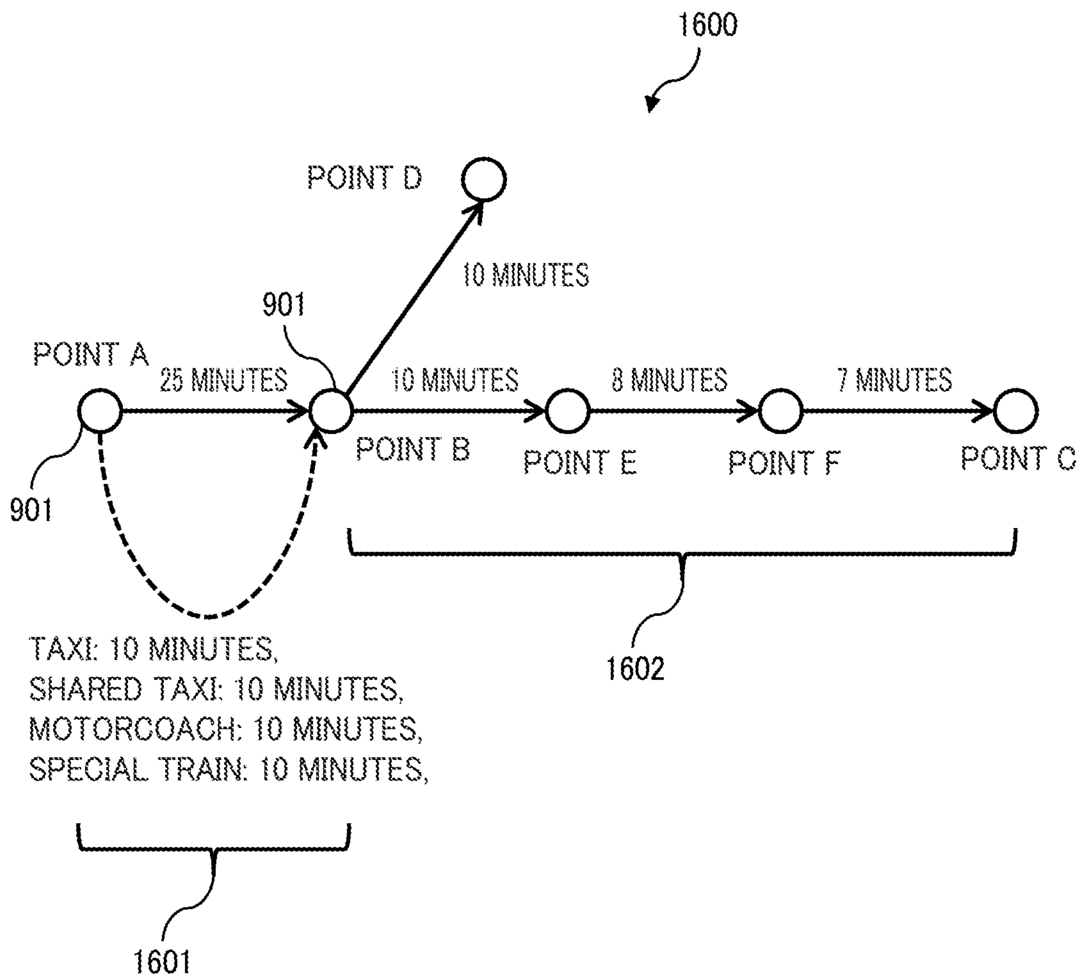
FIG. 17 is an exemplary partial model after addition of a special transportation facility at S303.

FIG. 17 is an exemplary partial model after having added a link of a special transportation facility at S303. As illustrated in the drawing, the shortest transportation route 1600 from "point A" which is the departure point to "point C" which is the destination point includes a transportation routes 1601 from the departure point "point A" to the via-point "point B" covered by a special transportation facility and a transportation route 1602 from the via-point "point B" to the destination point "point C" covered by a normal transportation facility.

Next, as illustrated in S305 of FIG. 16, the travel demand calculation unit 158 specifies a transportation facility that performs transportation in a transportation section corresponding to the transportation section of the special transportation facility specified at S304, and calculates (updates) the number of people using the special transportation facility (number of travel demands), on the basis of the number of people using the specified transportation facility.

Specifically, for example, the travel demand calculation unit 158 adds the number of travel demands (e.g., value of the number-of-people-demanding 205 in the travel demand information DB 2) for the transportation facility belonging to the travel demand group selected at S204 and performing transportation from the departure point to the destination point, to the present number of travel demands (the initial value is "0") for the special transportation facility specified at S303. Accordingly, travel demands (number of travel demands) for the special transportation facility is updated.

As has been described above, the transportation service information providing system 10 of the present embodiment specifies a transportation facility that performs transportation from a departure point to a destination point, extracts a special transportation facility that performs transportation in a partial section of a route from a departure point to a destination point, and specifies and outputs the special transportation facility as the transportation facility to be used for transportation from the departure point to the destination point, in a case where the extracted special transportation facility satisfies predetermined conditions relating to transportation in the partial section so that, in a case where transportation has become unavailable in a partial section of the route from the departure point to the destination point, it is possible to specify an appropriate special transportation means that performs transportation in the partial section, on the basis of a predetermined condition, and provide information of the specified special transportation facility. Accordingly, it is possible to provide business operators of transportation facilities and users of the transportation facilities with information on a special transportation service supposed to replace a part of a preliminarily planned transportation service in view of daily variation of demands or unexpected events (in case of service failure).

For example, a user of a transportation facility may travel from a departure point to an intermediate point using a special transportation facility and travel from the intermediate point to a destination point using a preliminarily planned transportation facility. In addition, a transportation facility manager can provide a user with an appropriate special transportation facility even when the user of the transportation facility has a demand for a medium or long distance travel.

In addition, the transportation service information providing system 10 of the present embodiment calculates a plurality of combinations of transportation facilities capable of performing transportation from a departure point to a destination point, calculates evaluation values relating to respective transportations by the calculated transportation facilities, and specifies the combination of transportation facilities with the highest calculated evaluation value as the transportation facilities that perform transportation from the departure point to the destination point, so that it is possible to provide a combination of appropriate transportation means that performs transportation from the departure point to the destination point. Accordingly, for example, it is possible to provide business operators of transportation facilities and users of the transportation facilities with a combination of appropriate transportation means.

In addition, the transportation service information providing system 10 of the present embodiment calculates the number of people using the extracted special transportation facility and, when the calculated number of people using the special transportation facility exceeds a predetermined value, specifies the special transportation facility as the transportation facility to be used for transportation from the departure point to the destination point, so that, for example, business operators of transportation facilities can grasp a special transportation facility expected to be demanded by users. In addition, users of transportation facilities also can grasp a special transportation facility which is likely to be operated.

In addition, the transportation service information providing system 10 of the present embodiment specifies a transportation facility corresponding to a special transportation facility and calculates the number of people using the special transportation facility, on the basis of the number of people using the specified transportation facility, so that, even when a special transportation facility may be operated in place of the original transportation facility, it is possible to appropriately estimate the number of people using the special transportation facility and thereby provide an appropriate special transportation facility.

In addition, the transportation service information providing system 10 of the present embodiment accepts input of conditions relating to a departure point, a destination point, and a time zone of transportation, and optionally, accepts input of conditions relating to at least any of a via-point between the departure point and the destination point, cost relating to transportation from the departure point to the destination point, time required for transportation from the departure point to the destination point, and time required for transfer at the via-point, and outputs information on the special transportation facility specified, on the basis of the input conditions, so that it is possible to provide, for example, business operators of transportation facilities and users of the transportation facilities with an appropriate special transportation facility that satisfies a desired condition.

In addition, the transportation service information providing system 10 of the present embodiment accepts selection of an extracted special transportation facility and specifies a transportation facility to be used for transportation from the departure point to the destination point among the selected special transportation facilities, so that it is possible to provide, for example, only the special transportation facility desired by users of transportation facilities.

Hereinabove, the present invention, which is not limited to the aforementioned embodiments, includes a variety of variations. For example, the aforementioned embodiments, which have been described in detail to explain the present invention in a comprehensive manner, are not limited to those including all of the components described above. In addition, it is possible to replace apart of the components of a certain embodiment with components of other embodiments, or add components of other embodiments to components of a certain embodiment. In addition, a part of the components of respective embodiments may be deleted, may have other components added thereto, or may be replaced by other components.

What is claimed is:

1. A transportation service information providing system having a first processor and a first memory for providing information on transportation from a departure point to a destination point by one of a plurality of transportation facilities, the system comprising:

a service planner having a second processor, a second memory and an input/output (I/O) device, wherein a first transport facility is configured to:

specify, via the second processor, one of the plurality of transportation facilities that performs transportation from the departure point to the destination point;

calculates, via the second processor, a plurality of combinations of the plurality of transportation facilities capable of performing transportation from the departure point to the destination point, and calculates evaluation values relating to respective transportations by the calculated transportation facilities;

specifies, via the second processor, the combination of the plurality of transportation facilities with a highest calculated evaluation value as the plurality of transportation facilities that perform transportation from the departure point to the destination point;

extract, via the second processor, a special transportation facility which is a different transportation facility from the specified transportation facility and performs transportation for a partial section in the transportation from the departure point to the destination point;

specify, via the second processor, the special transportation facility as the transportation facility to be used for transportation from the departure point to the destination point, in a case where the extracted special transportation facility satisfies predetermined conditions relating to the transportation for the partial section;

output, via an output side of the I/O, in conjunction with the second processor, information on the specified special transportation facility, to at least one of a second I/O of a passenger terminal, a third I/O of a transportation planner, and an input side of the I/O, accept, via the input side of the I/O in conjunction with the second processor, input of conditions relating to the departure point, the destination point and a time zone of the transportation, and optionally, accept input of conditions relating to at least one of a via-point between the departure point and the destination point, cost relating to transportation from the departure point to the destination point, time required for transportation from the departure point to the destination point and time required for transfer at the via-point; and wherein the I/O outputs information on the special transportation facility specified on the basis of the input conditions.

2. The transportation service information providing system according to claim 1, wherein the second processor calculates the number of people using the extracted special transportation facility and, when the calculated number of people using the special transportation facility exceeds a predetermined value, the second processor specifies the special transportation facility as the transportation facility to be used for transportation from the departure point to the destination point.

3. The transportation service information providing system according to claim 2, wherein the second processor specifies the transportation facility corresponding to the extracted special transportation facility, and calculates the number of people using the special transportation facility, on the basis of the number of people using the specified transportation facility.

4. The transportation service information providing system according to claim 1, wherein the input side of the I/O, in conjunction with the second processor is configured to accept selection of the extracted special transportation facility, and specifies the transportation facility to be used for transportation from the departure point to the destination point, from among the selected special transportation facilities.

5. The transportation service information providing system according to claim 1, wherein the input side of the I/O is configured to accept selection of the extracted special transportation facility, wherein the second processor, calculates a plurality of combinations of the plurality of transportation facilities capable of performing transportation from the departure point to the destination point, and calculates evaluation values relating to respective transportations by the calculated transportation facilities, and specifies a combination of the plurality of transportation facilities with the highest calculated evaluation value as the transportation facilities that perform transportation from the departure point to the destination point, and wherein the second processor, specifies the transportation facility corresponding to the extracted special transportation facility, and calculates the number of people using the special transportation facility, on the basis of the number of people using the specified transportation facility, and when the calculated number of people using the special transportation facility exceeds a predetermined value, specifies the special transportation facility selected among the special transportation facilities as the transportation facility to be used for transportation from the departure point to the destination point, and wherein the I/O outputs information on the special transportation facility specified on the basis of the input conditions.

6. A transportation service information providing method for providing information on transportation from a departure point to a destination point by a transportation facility, wherein an information processing device having a processor, a first I/O and a memory executes:

a transportation facility specification process of specifying a transportation facility that performs transportation from the departure point to the destination point;

wherein the transportation facility specification process is further the process of calculating a plurality of combinations of transportation facilities capable of performing transportation from the departure point to the destination point, and calculating evaluation values relating to respective transportations by the calculated transportation facilities, and specifying the combination of transportation facilities with a highest calculated evaluation value as the transportation facilities that perform transportation from the departure point to the destination point;

a special transportation facility extraction process of extracting a special transportation facility which is a different transportation facility from the specified transportation facility and performs transportation for a partial section in the transportation from the departure point to the destination point;

a special transportation facility specification process of specifying the special transportation facility as the transportation facility to be used for transportation from the departure point to the destination point, in a case where the extracted special transportation facility satisfies predetermined conditions relating to the transportation for the partial section;

a special transportation facility information output process of outputting information on the specified special transportation facility, via an output side of the first I/O in conjunction with the processor, to at least one of a second I/O of a passenger terminal, a third I/O of a transportation planner, and an input side of the I/O, the input side of the first I/O in conjunction with the processor, is configured to accept input of conditions relating to the departure point, the destination point and a time zone of the transportation, and optionally, accept input of conditions relating to at least one of a via-point between the departure point and the destination point, cost relating to transportation from the departure point to the destination point, time required for transportation from the departure point to the destination point and time required for transfer at the via-point; and wherein the first I/O outputs information on the special transportation facility specified on the basis of the input conditions.

7. The transportation service information providing method according to claim 6, wherein the special transportation facility specification process is a process of calculating the number of people using the extracted special transportation facility, and when the calculated number of people using the special transportation facility exceeds a predetermined value, specifying the special transportation facility as the transportation facility to be used for transportation from the departure point to the destination point.

8. The transportation service information providing system according to claim 1, wherein the passenger terminal includes the second I/O, a third memory and a third processor, and wherein the transportation planner includes the third I/O, a fourth memory and a fourth processor.

9. The transportation service information providing system according to claim 6, wherein the passenger terminal includes the second I/O, a second memory and a second processor, and wherein the transportation planner includes the third I/O, a third memory and a third processor.

* * * * *